US007823718B2

(12) United States Patent
Spencer

(10) Patent No.: US 7,823,718 B2
(45) Date of Patent: Nov. 2, 2010

(54) DYNAMIC CONVEYANCE DEVICE

(75) Inventor: Mark W. Spencer, Oshkosh, WI (US)

(73) Assignee: Arrowhead Systems, Inc., Oshkosh, WI (US)

(*) Notice: Subject to any disclaimer, the term of this patent is extended or adjusted under 35 U.S.C. 154(b) by 823 days.

(21) Appl. No.: 11/737,882

(22) Filed: Apr. 20, 2007

(65) Prior Publication Data
US 2008/0093197 A1    Apr. 24, 2008

Related U.S. Application Data

(60) Provisional application No. 60/793,532, filed on Apr. 20, 2006, provisional application No. 60/853,071, filed on Oct. 20, 2006.

(51) Int. Cl.
*B65G 37/00* (2006.01)
(52) U.S. Cl. ............... 198/594; 198/347.3; 198/778
(58) Field of Classification Search ............ 198/347.3, 198/452, 594, 597, 778
See application file for complete search history.

(56) References Cited

U.S. PATENT DOCUMENTS

| | | | |
|---|---|---|---|
| 3,318,439 A * | 5/1967 | Sullivan | 198/347.1 |
| 4,142,626 A | 3/1979 | Bradley | |
| 4,168,776 A | 9/1979 | Hoeboer | |
| 4,549,647 A | 10/1985 | Cossé | |
| 4,697,691 A | 10/1987 | Zodrow et al. | |
| 4,872,543 A | 10/1989 | Hinchcliffe | |
| 5,361,888 A | 11/1994 | Brown et al. | |
| 5,413,213 A | 5/1995 | Golz et al. | |
| 5,680,923 A | 10/1997 | Gram | |
| 5,772,005 A | 6/1998 | Hänsch | |
| 5,833,045 A | 11/1998 | Osti et al. | |
| 6,016,904 A | 1/2000 | Hammock et al. | |
| 6,026,947 A | 2/2000 | Persson | |
| 6,152,291 A | 11/2000 | Steeber et al. | |
| 6,182,812 B1 | 2/2001 | Hartness, III et al. | |
| 6,230,874 B1 | 5/2001 | Steeber et al. | |
| 6,334,528 B1 * | 1/2002 | Bogle et al. | 198/836.3 |
| 6,382,398 B2 * | 5/2002 | Steeber et al. | 198/594 |
| 6,394,261 B1 | 5/2002 | DeGennaro | |
| 6,422,380 B1 | 7/2002 | Sikora | |

(Continued)

FOREIGN PATENT DOCUMENTS

CA    2364216 A1    7/2003

(Continued)

*Primary Examiner*—Douglas A Hess
(74) *Attorney, Agent, or Firm*—Boyle Fredrickson, S.C.

(57) ABSTRACT

A conveyance device is configured to carry a product. The conveyance device includes a first path configured to carry the product in a first direction, a second path configured to carry the product in a second direction, and a transfer assembly positioned adjacent to a portion of the first path to facilitate transfer of the product from the first path to the second path. The conveyance device also includes a guide system configured to move the transfer assembly along the first path. The guide system includes a base positioned proximate the first path and the second path and an arm coupled to the base and extending above a portion of the first path and a portion of the second path. The arm is configured to move in a first manner and a second manner relative to the base. The transfer assembly is movably coupled to the arm.

24 Claims, 16 Drawing Sheets

U.S. PATENT DOCUMENTS

| | | |
|---|---|---|
| 6,497,321 B2 | 12/2002 | Horton et al. |
| 6,523,669 B1 | 2/2003 | Steeber et al. |
| 6,533,103 B2 | 3/2003 | Hartness et al. |
| 6,585,104 B2 * | 7/2003 | Horton et al. ............... 198/594 |
| 6,591,963 B2 | 7/2003 | Wipf |
| 6,612,420 B1 | 9/2003 | Hartness, III et al. |
| 6,698,581 B2 | 3/2004 | Steeber et al. |
| 6,725,998 B2 * | 4/2004 | Steeber et al. ........... 198/347.4 |
| 6,814,533 B1 | 11/2004 | Prud'Homme et al. |
| 6,848,563 B2 | 2/2005 | Abert et al. |
| 7,032,742 B2 | 4/2006 | Hartness et al. |
| 7,191,896 B2 * | 3/2007 | Hartness et al. ............. 198/594 |
| 7,198,147 B2 | 4/2007 | Petrovic |
| 7,222,718 B2 | 5/2007 | Tarlton |
| 7,341,141 B2 | 3/2008 | Spatafora |

FOREIGN PATENT DOCUMENTS

| | | |
|---|---|---|
| DE | 202004012848 U1 | 3/2005 |
| DE | 102004053663 A1 | 8/2005 |
| DE | 102004007590 A1 | 9/2005 |
| DE | 102004021164 A1 | 11/2005 |
| DE | 202005013552 U1 | 11/2005 |
| DE | 202004016069 U1 | 12/2005 |
| FR | 2766803 A1 | 2/1999 |
| WO | 0198187 A1 | 12/2001 |

* cited by examiner

FIG. 4A

DYNAMIC CONVEYANCE DEVICE

CROSS-REFERENCE TO RELATED APPLICATIONS

This application claims priority to U.S. Provisional Patent Application No. 60/793,532, entitled "Dynamic Conveyance Device", filed Apr. 20, 2006 by Mark W. Spencer and to U.S. Provisional Patent Application No. 60/853,071, entitled "Dynamic Conveyance Device", filed Oct. 20, 2006 by Mark W. Spencer, the entire contents of both of which are hereby incorporated by reference.

BACKGROUND

The present invention relates to a dynamic conveyance device for temporarily accumulating conveyed product.

A dynamic conveyance device is used in a product processing or conveying system to provide a means for handling variations in product flow when either upstream or downstream flow rates change in volume or type. For example, in the event downstream processing is delayed or inoperable, the device temporarily accumulates conveyed products in order to maintain upstream flow rates constant. Most devices transfer products from incoming to outgoing flow paths (i.e., chains or conveyor belt); however, existing designs use complex transfer mechanisms to achieve a dynamic flow between flow paths. For example, the transfer devices are either driven by a motor or tied by a sprocket into the flow paths. Existing conveyance devices space the flow paths roughly 24 inches apart to accommodate the transfer mechanisms between the paths. Further, the transfer mechanisms require multiple transfers between incoming and outgoing flow paths.

SUMMARY

In one embodiment, the invention provides a conveyance device configured to carry a product. The conveyance device includes a first path configured to carry the product in a first direction, a second path configured to carry the product in a second direction, and a transfer assembly positioned adjacent to a portion of the first path to facilitate transfer of the product from the first path to the second path. The conveyance device also includes a guide system configured to move the transfer assembly along the first path. The guide system includes a base positioned proximate the first path and the second path and an arm coupled to the base and extending above a portion of the first path and a portion of the second path. The arm is configured to move in a first manner and a second manner relative to the base. The transfer assembly is movably coupled to the arm.

In another embodiment, the invention provides a conveyance device configured to carry a product. The conveyance device includes a lane having a generally spiral configuration such that portions of the lane are positioned adjacent to each other. The lane includes a first end positioned generally outwardly of the spiral configuration, a second end positioned generally inwardly of the spiral configuration, a first path configured to carry the product towards the second end, and a second path adjacent to and generally aligned with the first path. The second path is configured to carry the product towards the first end. The conveyance device also includes a transfer assembly positioned adjacent to at least a portion of the lane to facilitate transfer of the product from the first path to the second path and a guide system configured to move the transfer assembly along the lane. The guide system includes a base positioned proximate the lane and an arm coupled to the base and extending above a portion of the lane. The arm is configured to move in a first manner and a second manner relative to the base. The transfer assembly is movably coupled to the arm.

In yet another embodiment, the invention provides a conveyance device configured to carry a product. The conveyance device includes a first path configured to carry the product in a first direction and a second path positioned adjacent to and generally aligned with the first path to define a lane. The second path is configured to carry the product in a second direction that is substantially opposite the first direction. The first path and the second path have a generally spiral configuration such that portions of the lane are adjacent to each other. The conveyance device also includes a transfer assembly positioned adjacent to a portion of the lane to facilitate transfer of the product from the first path to the second path. The transfer assembly includes a frame, an outer guide coupled to the frame and having at least one roller, an inner guide coupled to the frame and positioned radially inwardly from the outer guide, and a slider device coupled to the frame. The conveyance device also includes a guide system configured to move the transfer assembly along the first path and the second path. The guide system includes a base positioned proximate the first path and the second path and an arm rotatably and slidably coupled to the base. The arm extends above a portion of the lane. The transfer assembly is slidably coupled to the arm by the slider device to facilitate movement of the transfer assembly relative to the arm. The guide system also includes a first motor configured to move the arm in a generally linear direction along the base and a second motor configured to rotate the arm relative to the base.

Other aspects of the invention will become apparent by consideration of the detailed description and accompanying drawings.

BRIEF DESCRIPTION OF THE DRAWINGS

FIG. 4A is a front perspective view of a transfer assembly for the dynamic conveyance device.

Figure 1:
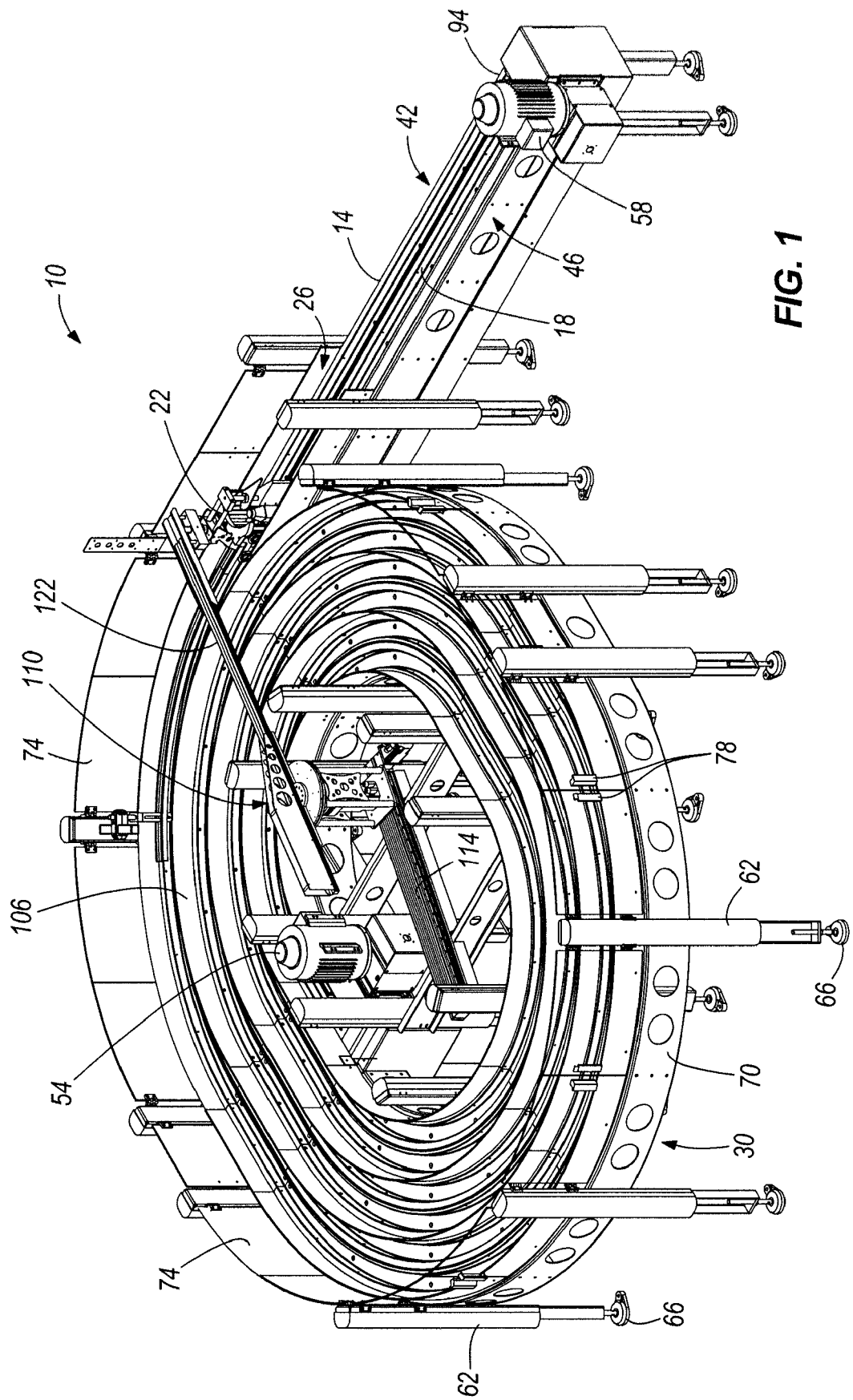
FIG. 1 is a perspective view of a dynamic conveyance device according to one embodiment of the invention, the conveyance device having an ovular configuration and guide system for operating a traveling transfer assembly.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

A dynamic conveyance device 10 is used in a product processing or conveying system to provide a means for handling variations in product flow when either upstream or downstream flow rates change in volume or type. In the event downstream processing is delayed or inoperable, the conveyance device 10 temporarily accumulates conveyed products 12 in order to maintain upstream flow rates constant. The conveyance device 10 includes an infeed conveyor path 14, an outfeed conveyor path 18, and a transfer guide assembly 22 to transfer products 12 from the infeed path 14 to the outfeed path 18. The transfer assembly 22 uses a guide means, rather than a complex transfer mechanism to move product 12 from the infeed path 14 to the outfeed path 18. The transfer assembly 22 travels along a travel path or lane 26 that is generally defined above the infeed path 14 and the outfeed path 18. In the illustrated embodiments, the conveyance device 10 is arranged in a horizontal plane with respect to a floor to provide improved product stability relative to vertically arranged accumulators, and to utilize the least amount of floor space while providing the greatest volume of accumulated product. The product quantity held in the conveyance device 10 is controlled by moving the transfer assembly 22 in either direction along the lane 26. It should be readily apparent to those of skill in the art that a single level conveyance device may be joined to a second level for modular increase of product volume, as discussed below with respect to FIG. 10.

Figure 2:
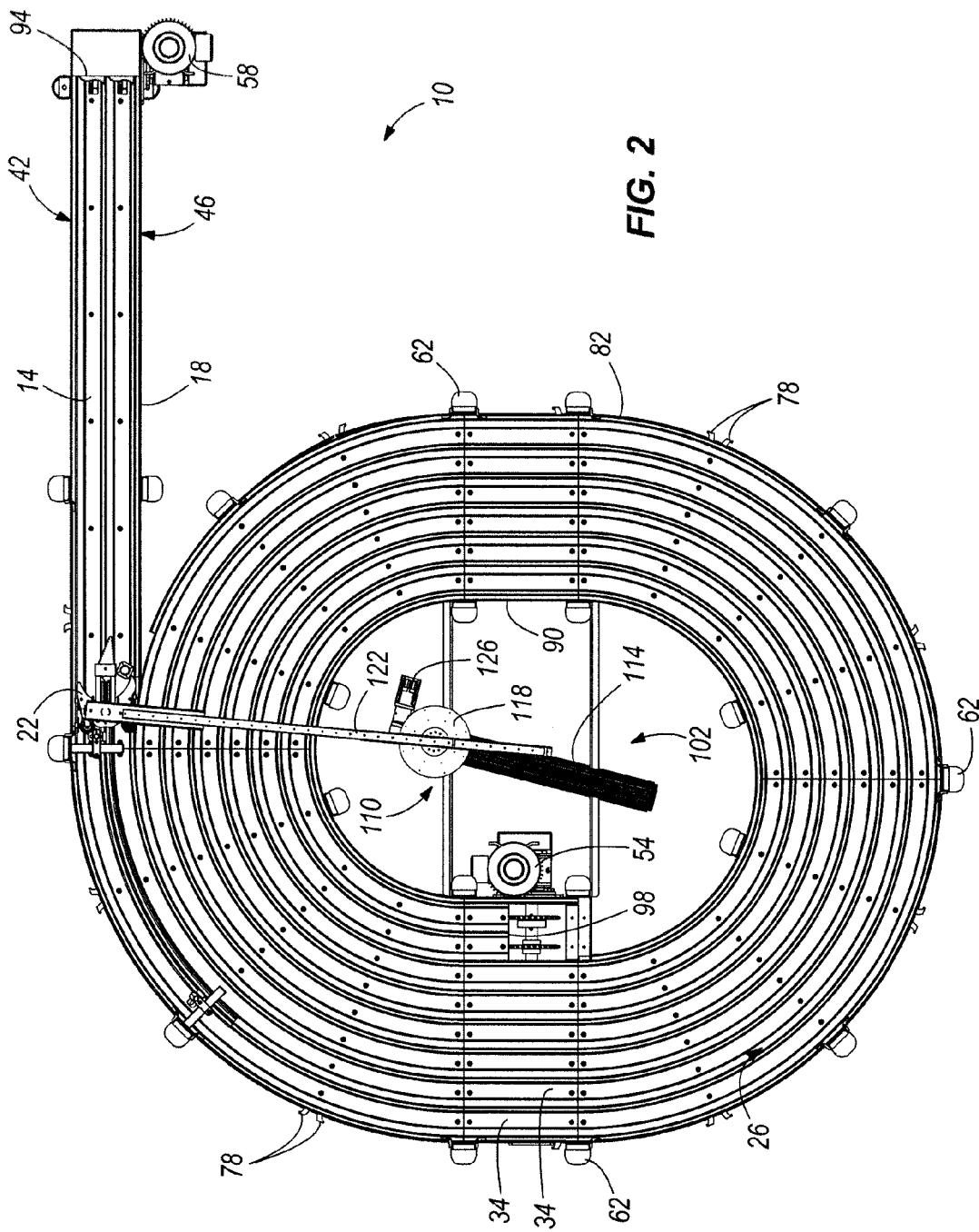
FIG. 2 is a top view of the dynamic conveyance device shown in FIG. 1.
Figure 3:
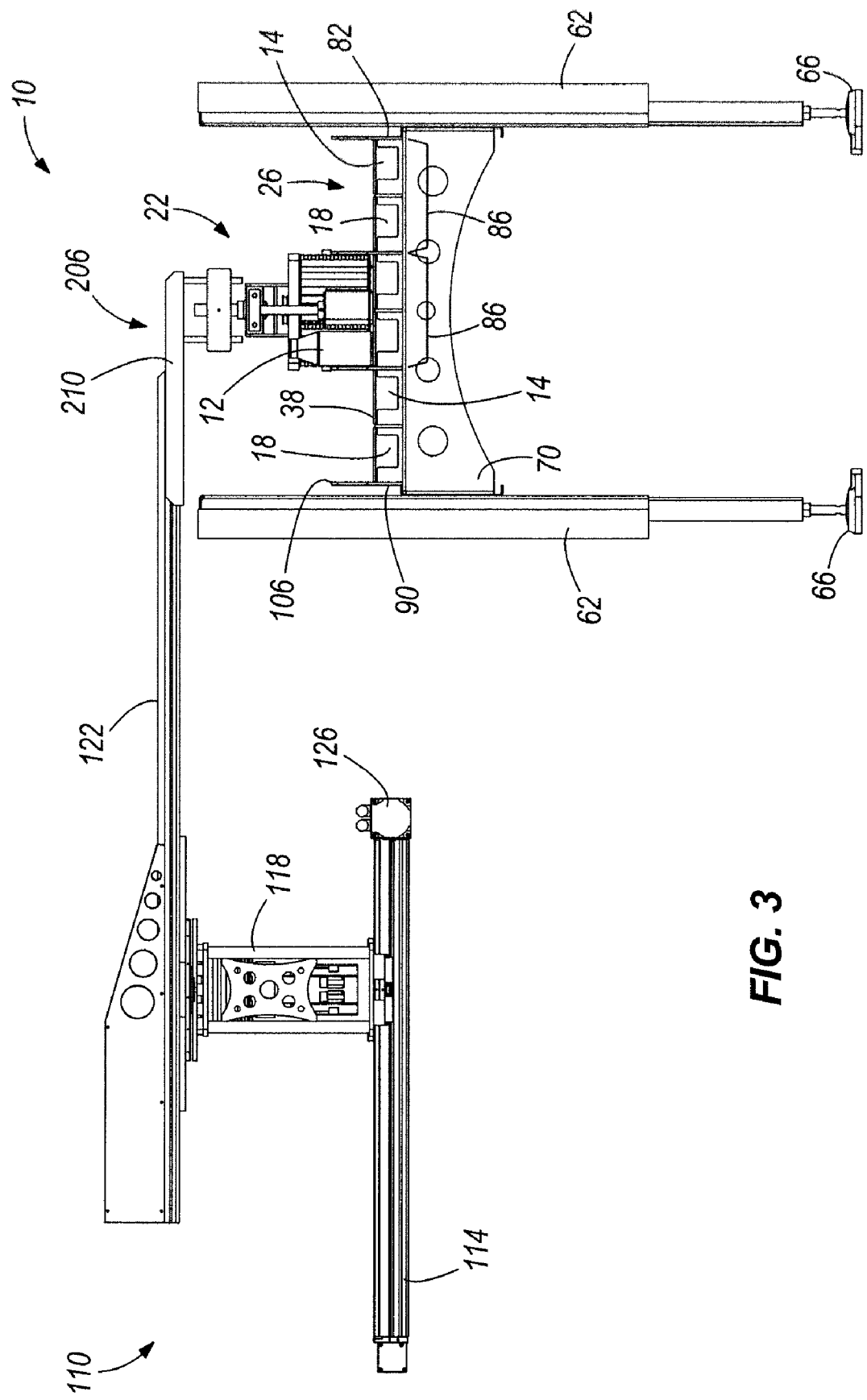
FIG. 3 is a sectional view of the dynamic conveyance device shown in FIG. 1.

Referring to FIGS. 1-3, the conveyance device 10 includes a structural framework 30 that supports a series of track segments 34 (FIG. 2) of straight or arcuate shape having varying length and/or radii. The segments 34 attach over the framework 30 to form an infeed track 14 and an outfeed track 18. The tracks 14, 18 are aligned generally in parallel and turn inward towards a center of the conveyance device 10 such that the tracks 14, 18 have a spiral configuration and a decreasing spiral radius. In the illustrated embodiments, the outer segment 34 begins the infeed path 14 and the next segment 34 is laid inward from the outer segment 34 to begin the outfeed path 18. The segments 34 are laid side-by-side in a generally parallel relationship and are configured to receive a movable carrying surface 38 (FIG. 3), such as a belt or chain, to define the infeed path 14 and the outfeed path 18. Carrying surfaces 38 are positioned so that a minimal gap exists therebetween to facilitate product direction change from the infeed path 14 to the outfeed path 18 without a transfer path. This device uses a continuous, decreasing radius, by-directional product path. It should be readily apparent to those of skill in the art that the product path (i.e., track path) is of a spiral configuration and the overall shape of the conveyance device 10 may be circular (FIG. 9), ovular (FIGS. 2 and 10), or any other known shape that facilitates side-by-side arrangement of the paths and smooth product flow.

The transfer assembly 22 facilitates direction change (i.e., transfer) of conveyed product 12 between the infeed path 14 and an outfeed path 18. In one embodiment, such as the embodiment shown in FIGS. 1-3, the transfer assembly 22 is coupled to an arm of a two-axis guide system. The arm is rotated and/or translated by a motor to move the transfer assembly 22. In another embodiment, such as the embodiments shown in FIGS. 15-17, the transfer assembly 22 is suspended from an overhead framework and/or trolley track. In one embodiment of the overhead mounted transfer assembly 22, the transfer assembly 22 utilizes a mobile power supply system. For example, the transfer assembly 22 is moved by motor driven wheels along the track of the overhead framework. In another embodiment, the transfer assembly 22 is moved by a mechanism coupled to the path components, such that the carrying surface 38 pushes or pulls the transfer assembly 22 along the paths 14, 18 dependent on need for accumulation or discharge rate changes.

The transfer assembly 22 includes a 180 degree guide means that may use rollers, belting, fixed rails, powered rollers, or a combination thereof to facilitate transfer of products between the two paths 14, 18. The transfer assembly 22 spans one track of the infeed path 14 and one track of the outfeed path 18 (i.e., has a width equal to about a combined width of two adjacent track segments 34), and travels along and between the infeed and outfeed paths 14, 18 as required to accumulate product or to discharge product based upon system demand. The transfer assembly 22 described above eliminates the need for a transfer point and transfer path or mechanism to transfer product between the infeed and outfeed paths 14, 18. Placing the product carrying surfaces 38 in a side-by-side arrangement eliminates spacing for a complex transfer mechanism, which reduces floor space required for the conveyance device 10.

In one embodiment, product 12 is diverted from a main conveyor (not shown) to the infeed conveyor 14 of the conveyance device 10 at an infeed portion 42 for accumulation and varying product flow. Product exits the conveyance device 10 on the outfeed conveyor 18 at an outfeed portion 46 and is delivered to an outfeed section of the main conveyor. Speed of the outfeed conveyor 18 is controlled by an electronic controller (not shown), such as a PLC, that signals a drive controller to operate a variable speed motor at a certain RPM on the outfeed section of the main conveyor. A similar electronic controller controls the conveyance device 10, including the transfer assembly 22 and variable infeed and outfeed conveyor speeds. For example, the conveyance device controller coordinates movement of the transfer assembly 22 along the lane 26 based upon different operating parameters, including speeds of the infeed and outfeed conveyors 14, 18. The conveyance device controller communicates via a programmed feedback signal with the main controller to monitor the speed signal to the main conveyor. The conveyance device controller will then alter its signal to the outfeed conveyor motor to match the speed of the outfeed section of the main conveyor. In a further embodiment, the outfeed conveyor 18 travels to a subsequent processing station, thereby eliminating a need for an outfeed section of the main conveyor and feedback loops between the two controllers. The transfer assembly 22 may be operated based upon infeed conveyor speed, number of products 12 on the infeed path 14 (measured visually), outfeed conveyor speed, number of products 12 on the outfeed path 18, or other parameters.

FIGS. 1-3 illustrate one embodiment of the dynamic conveyance device 10 with the infeed path 14 and the outfeed path 18 arranged in a side-by-side configuration and wound in an inward, horizontal (i.e., spiral) pattern such that the conveyance device 10 has a generally ovular configuration. A first motor 54 drives the infeed path 14 in a first direction and a second motor 58 drives the outfeed path 18 in a second direction. In the illustrated embodiment, the infeed conveyor 14 enters the conveyance device 10 at one end of the device 10 and the outfeed conveyor 18 exits the device 10 at the same end.

The framework 30 includes support legs 62 and feet 66, a base frame 70, and upwardly extending frame pieces 74. The support legs 62 and feet 66 support the conveyance device 10 and space the device 10 above a floor, while the base frame 70 supports the track segments 34 and carrying surfaces 38. In the illustrated embodiment, the frame pieces 74 are supported by and pivotally coupled to the support legs 62. The frame pieces 74 include handles 78 to facilitate pivoting of the frame pieces 74 between an open position, allowing access to the interior region of the conveyance device 10, and a closed position.

Referring to FIG. 3, an inner track path/section 14 is positioned at an outermost edge 82 of the base frame 70 and an outer track path/section 18 is positioned inward from the inner track path 14 to form a conveyor section 86 such that product 12 may be transferred between the infeed and outfeed paths 14, 18. The conveyor section 86 includes adjacent track segments 34 (FIG. 2) of the infeed path 14 and the outfeed path 18 to define a lower boundary of the lane 26. A second inner track section 14 is positioned inward of the first outer section 18 and a second outer track section 18 is positioned inward of the second inner track section 14. This pattern is continued until the track paths extend between the outermost edge 82 of the base frame 70 and an innermost edge 90 of the base frame 70. The infeed track sections and the outfeed track sections will form one infeed path 14 and one outfeed path 18, respectively, from a start point 94 where the infeed conveyor 14 enters the conveyance device 10 and the outfeed conveyor 18 terminates, and a termination point 98 in a central area 102 (FIG. 2) of the conveyance device 10 where the infeed conveyor 14 terminates and the outfeed conveyor 18 begins.

Guide rails 106 are positioned between each conveyor section 86 to provide guidance and stability to products 12 conveyed along the infeed and outfeed paths 14, 18. In the illustrated embodiment, the guide rails 106 form one continuous guide rail about the conveyance device 10 between the start point 94 and the termination point 98. As such, the guide rails 106 define side boundaries of the lane 26, while the conveyor sections 86 define the lower boundary of the lane 26. In one embodiment, the top edges of the guide rails 106 are covered by a top cap to align adjacent segments of the guide rails 106.

The conveyance device 10 includes the transfer guide assembly 22 movable along the lane 26 by a guide system 110. In the illustrated embodiment, the guide system 110 is an overhead linear two-axis servo system and includes a bridge 114, or base, positioned in the central area 102 of the conveyance device 10, a rotary motor 118 slidably coupled to the bridge 114, and a linear servo arm 122 coupled to the rotary motor 118 to rotate relative to the bridge 114. In some embodiments, the bridge 114 may be a track or path formed in the floor supporting the conveyance device 10. The guide system 110 also includes a linear motor 126 movably mounted to the bridge 114 such that the attached rotary motor 118, and thereby the arm 122, travels along the length of the bridge 114. The arm 122 extends radially outward from the rotary motor 118 towards the outermost edge 82 of the conveyance device 10 and is spaced above the conveyance device 10 and the bridge 114.

Figure 4A:
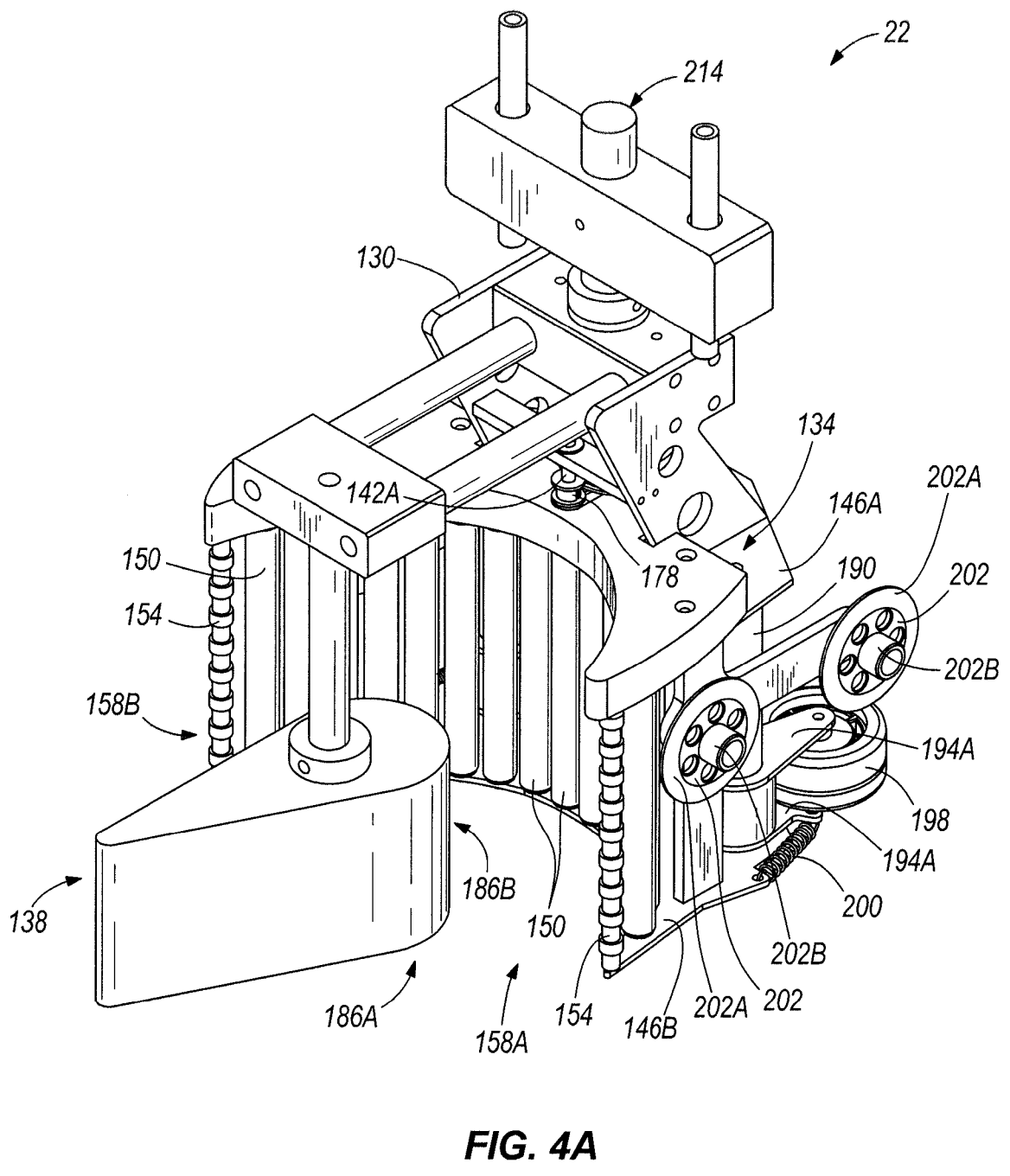
Figure 4B:
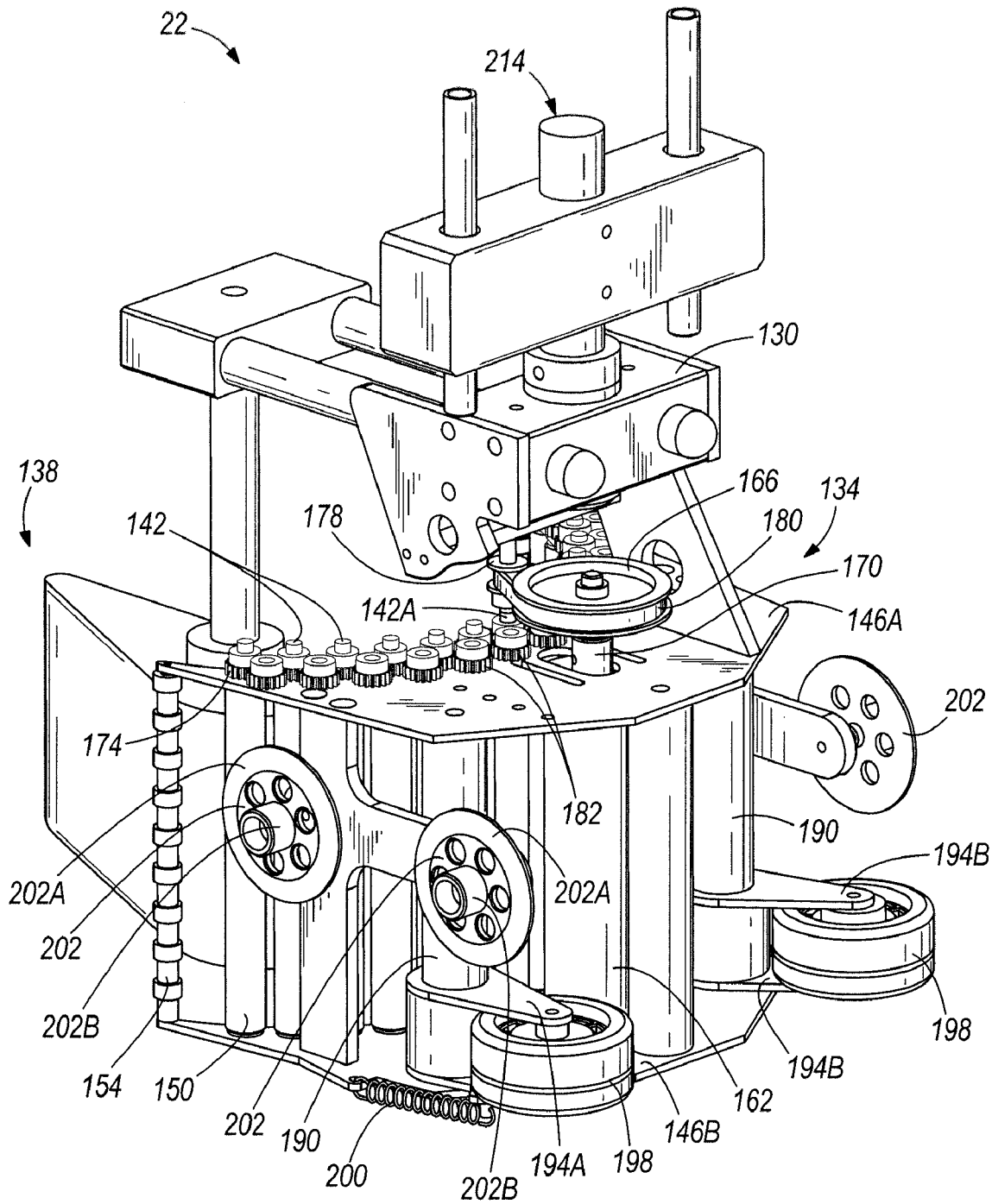
FIG. 4B is a rear perspective view of the transfer assembly shown in FIG. 4A.

FIGS. 4A and 4B illustrate one embodiment of the transfer guide assembly 22 for use with the conveyance device 10. The transfer assembly 22 includes a frame 130, an outer guide means 134 supported by the frame 130, and an inner guide means 138 supported by the frame 130. The outer guide means 134 includes a plurality of shafts 142 rotatably coupled to the frame 130 and extending between a first support plate 146A and a second support plate 146B of the frame 130. In the illustrated embodiment, each shaft 142 includes a urethane sleeve 150 for facilitating movement of a product 12 along the outer guide means 134. A shaft (not shown) supporting idle rollers 154 is positioned at an infeed end 158A and an outfeed end 158B of the outer guide means 134, whereby the rollers 154 extend between the first and second plates 146A, 146B. The idle rollers 154 provide corner guiding for transferred product.

In the illustrated embodiment, the shafts 142 are rotated to facilitate travel of the product through the transfer assembly 22; however, in other embodiments the shafts 142 may be idle. The transfer assembly 22 includes a drive motor 162 supported by the frame 130 and having a drive pulley 166 connected to a drive shaft 170 of the motor 162. The drive pulley 166 is positioned proximate the shafts 142 and a free end of each shaft 142 includes a gear 174 that is positioned above the first plate 146A in the illustrated embodiment. A center shaft 142A includes a pulley 178 for coupling to the drive pulley 166. A timing belt 180, or O-ring, for example made of urethane, couples the drive pulley 166 to the pulley 178 of the center shaft 142A. The frame 130 includes a plurality of gears 182 supported by the first plate 146A. One gear 182 is disposed proximate adjacent shafts 142 such that the gear 182 intermeshes with the shaft gears 174 of the two adjacent shafts 142. As a result, the shafts 142 are "daisy-chained" together by a gearing system such that drive motion from the motor 162 is translated to rotational motion of the shafts 142. During operation, the pulley 178 of the center shaft 142A is rotated by the drive pulley 166 which thereby causes rotation of the proximate frame gears 182. Rotation of the frame gears 182 causes rotation of the shaft gears 174 of the respective shafts 142 to thereby cause rotation of the shafts 142 and the adjacent frame gears 182.

In one embodiment, the shaft gears 174 are formed from a metal material and the frame gears 182 are formed from a plastic material (e.g., a poly, nylon, acetale, or the like). In a further embodiment, the gears 174, 182 may be formed from the same material. In another embodiment, the outer guide means 134 includes timing belts or O-rings positioned between the shafts 142 to rotate the shafts 142, or a single timing belt positioned alongside the shafts 142 engages each shaft 142 to cause rotation of the shafts 142.

In the illustrated embodiment, the inner guide means 138 is generally pie-shaped, or wedge-shaped. An infeed portion 186A of the inner guide means 138, positioned opposite the infeed portion 158A of the outer guide means 134, maintains curvature of the infeed path, while a center portion 186B of the inner guide means 138 releases the products 12 to the outfeed conveyor 18. Such a configuration reduces pressure on products 12 that pass through the transfer assembly 22. Additionally, the size or the position (e.g., spacing) of the inner guide means 138 relative to the outer guide means 134 may be adjusted to accommodate different sizes of products. In some embodiments, the inner guide means 138 may include rollers, idle or driven, to facilitate transfer of the products 12 to the outfeed conveyor 18, as shown and described with respect to FIG. 11.

It should be readily apparent to those of skill in the art that in further embodiments of the transfer assembly 22 that the guide means 134, 138 may be formed of rollers, timing belt (s), fixed rails, powered rails, or any combination thereof. Further, other mechanisms may be used to drivingly connect the shafts 142 of the guide means 134.

Spacers 190 are provided between the first and second plates 146A, 146B of the frame 130. Pairs of guide frames 194A, 194B are pivotally coupled to opposite spacers 190 of the transfer assembly 22 and extend from a rear edge of the transfer assembly 22. A roller 198 is supported by each pair of guide frames 194A, 194B and extends outwardly from the respective guide frames 194A, 194B. During use, each roller 198 rides along the guide rails 106 of the conveyance device 10 and provides stability to the transfer assembly 22. Springs 200 bias the rollers outwardly against the guide rails 106 as the transfer assembly 22 travels along the travel path 50. Spring-loaded guide rollers 202 extend outwardly from the outer guide means 134 to ride upon the guide rails 106. Flanged portions 202A of the rollers 202 are biased against a side edge of the rails 106, and a roller portion 202B of the rollers 202 ride upon the rails 106.

The transfer assembly 22 also includes a slider device 206 (FIG. 3) for operably connecting the transfer assembly 22 to the arm 122. In the illustrated embodiment, the slider device 206 includes a linear bearing 210 to "free float" the transfer assembly 22 along the arm 122. Connecting means 214 adjustably connect the frame 130 to the slider device 206. In one embodiment, the connecting means 214 may include, for example, a bolt and nut combination, but it should be readily apparent that other connecting means may also be used.

During operation, to move the transfer assembly 22 along linear portions of the lane 26, the rotary motor 118 and the arm 122 travel along the bridge 114. While the transfer assembly 22 is traveling along the linear portions, the transfer assembly 22 remains generally stationary relative to the arm 122. In the illustrated embodiment, the rotary motor 118 is configured to travel along a length of the bridge 114 substantially equal to a length of the linear portions of the lane 26. Thereby, the bridge 114 defines a travel path for the rotary motor 118 including ends 114A, 114B, which are positioned generally along a centerline of the turn radiuses for the conveyors 14, 18. When the rotary motor 118 reaches either end 114a, 114b, the rotary motor 118 rotates the arm 122, and thereby the transfer assembly 22, relative to the bridge 114 such that the transfer assembly 22 travels along curved portions of the lane 26.

In the illustrated embodiment, to increase the amount of products accumulated in the conveyance device 10, the transfer assembly 22 is moved in a counter-clockwise direction along the lane 26. This movement is accomplished by moving the arm 122 along a length of the bridge 114 while the transfer assembly 22 is positioned in linear portions of the lane 26 and rotating the arm 122 counter-clockwise about the bridge 114 while the transfer assembly 22 is positioned in curved portions of the lane 26. As the transfer assembly 22 travels through curved portions of the lane 26, the slider device 206 facilitates movement of the transfer assembly 22 inward along the arm 122.

Further, to decrease the amount of products accumulated in the conveyance device 10, the transfer assembly 22 is moved in a clockwise direction along the lane 26. This movement is accomplished by moving the arm 122 along a length of the bridge 114 while the transfer assembly 22 is positioned in linear portions of the lane 26 and rotating the arm 122 clockwise about the bridge 114 while the transfer assembly 22 is positioned in curved portions of the lane 26. As the transfer assembly 22 travels through curved portions of the lane 26, the slider device 206 facilitates movement of the transfer assembly 22 outward along the arm 122.

Figure 5:
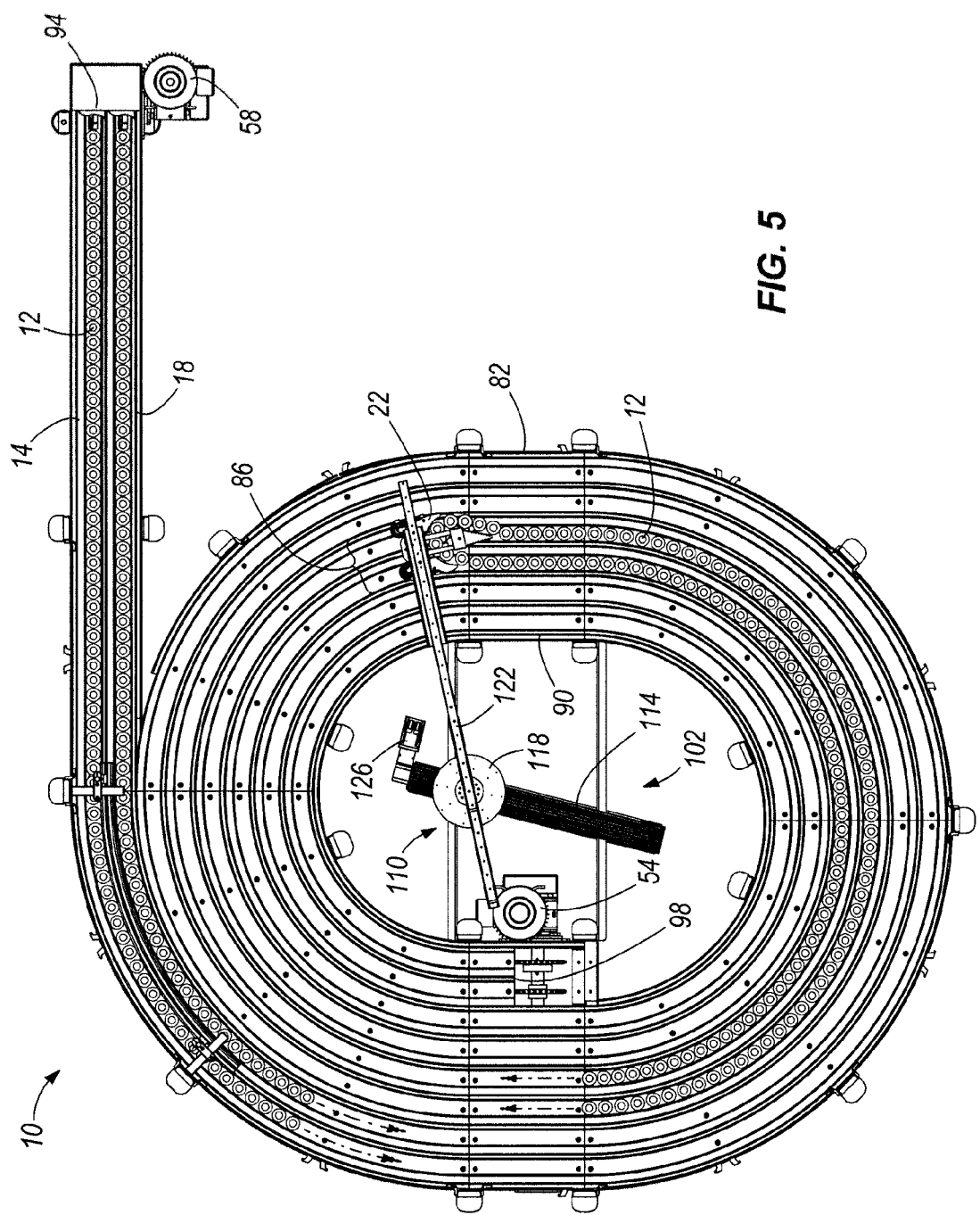
FIG. 5 is a top view of the dynamic conveyance device shown in FIG. 1 and illustrating the transfer assembly in a first position.
Figure 6:
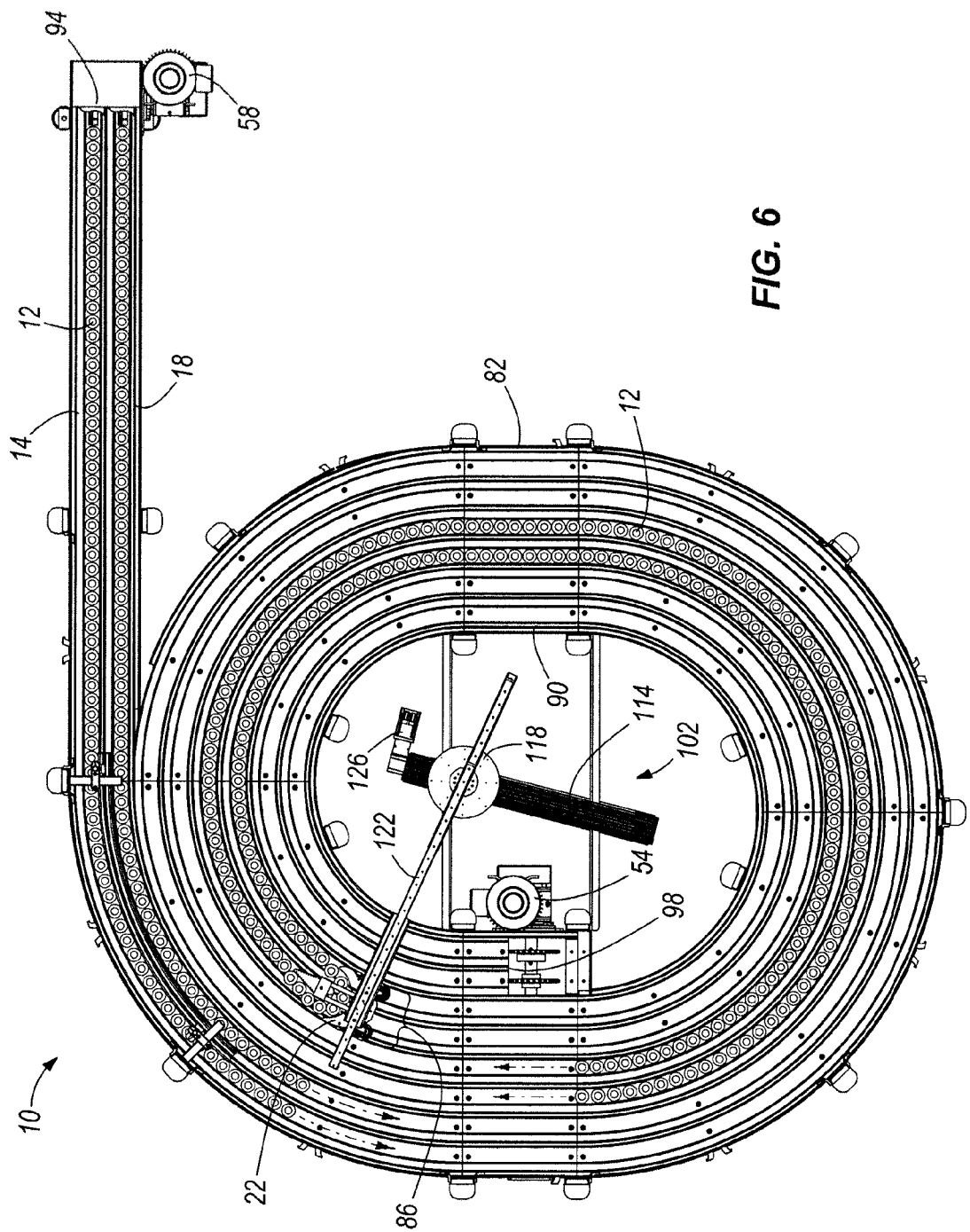
FIG. 6 is a top view of the dynamic conveyance device shown in FIG. 1 and illustrating the transfer assembly in a second position.
Figure 7:
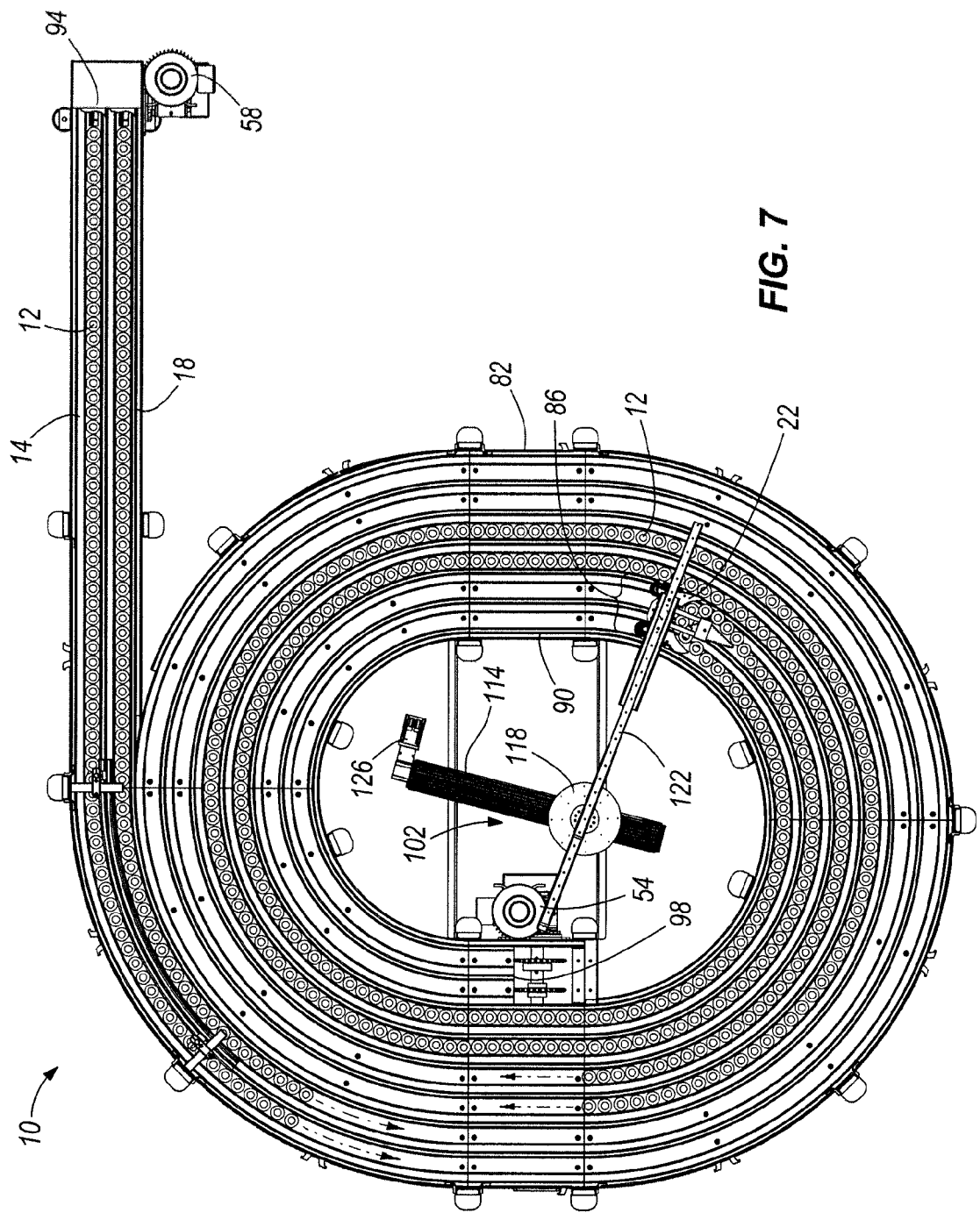
FIG. 7 is a top view of the dynamic conveyance device shown in FIG. 1 and illustrating the transfer assembly in a third position.

FIGS. 5-7 illustrate the dynamic conveyance device 10 with the transfer assembly 22 in three different positions. FIG. 5 shows the transfer assembly 22 in a first position, where the rotary motor 118 is positioned adjacent to one end 114A of the bridge 114 and the transfer assembly 22 is positioned on the second conveyor section 86 inward from the outermost edge 82. FIG. 6 shows the transfer assembly 22 in a second position, where the rotary motor 118 is in relatively the same position on the bridge 114 as in FIG. 5, but has rotated the arm 122 such that the transfer assembly 22 is now in the third conveyor section 86 inward from the outermost edge 82. FIG. 7 shows the transfer assembly 22 in a third position, where the rotary motor 118 has moved to the other end 114B of the bridge 114 and has rotated the arm 122 such that the transfer assembly 22 is still in the third conveyor section 86 inward from the outermost edge 182, but is now positioned on an opposite side of the conveyance device 10 as compared to FIG. 6. As such, of the illustrated positions, the device 10 takes-up the most product 12 when the transfer assembly 22 is in the third position, and takes-up the least product 12 when the transfer assembly 22 is in the first position. Of course, it should be readily apparent to one skilled in the art that the transfer assembly 22 may move to a position closer to the termination point 98 to take-up more product 12, or to a position closer to the start point 94 to take-up less product 12.

Figure 8:
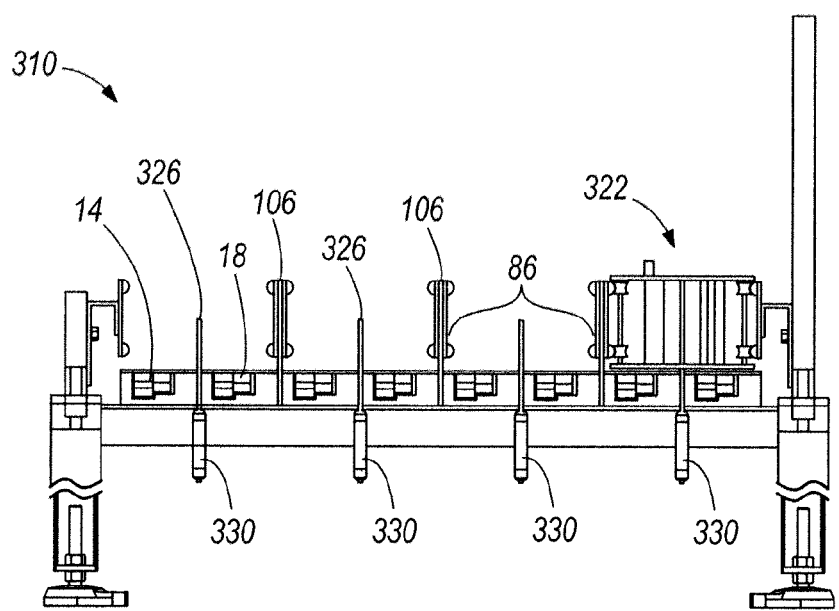
FIG. 8 is a sectional view a dynamic conveyance device according to another embodiment of the invention, the dynamic conveyance device having an intermediate rail.

FIG. 8 illustrates a dynamic conveyance device 310 according to another embodiment of the invention. The conveyance device 310 is similar to the conveyance device 10 shown in FIGS. 1-3, and like features will be identified by the same reference numerals. In the illustrated embodiment, an intermediate rail 326 is positioned between the infeed path 14 and the outfeed path 18 of each conveyor section 86 for maintaining product separation between the infeed path 14 and the outfeed path 18 and providing an intermediate support. The intermediate rail 326 supports conveyed products in the adjacent paths 14, 18 and prevents products that tip from falling into products in adjacent paths 14, 18 (i.e., creating a domino effect). In the illustrated embodiment, each rail section 326 is coupled to an actuator 330 supported by the base frame 70. The actuator 330 moves the rail 326 into and out of position between the infeed and outfeed paths 14, 18 as a transfer assembly 322 moves along the lane 26. In one embodiment, actuation of the rail sections 326 is controlled by a controller based upon the position of the transfer assembly 322 and/or a guide system.

Figure 9:
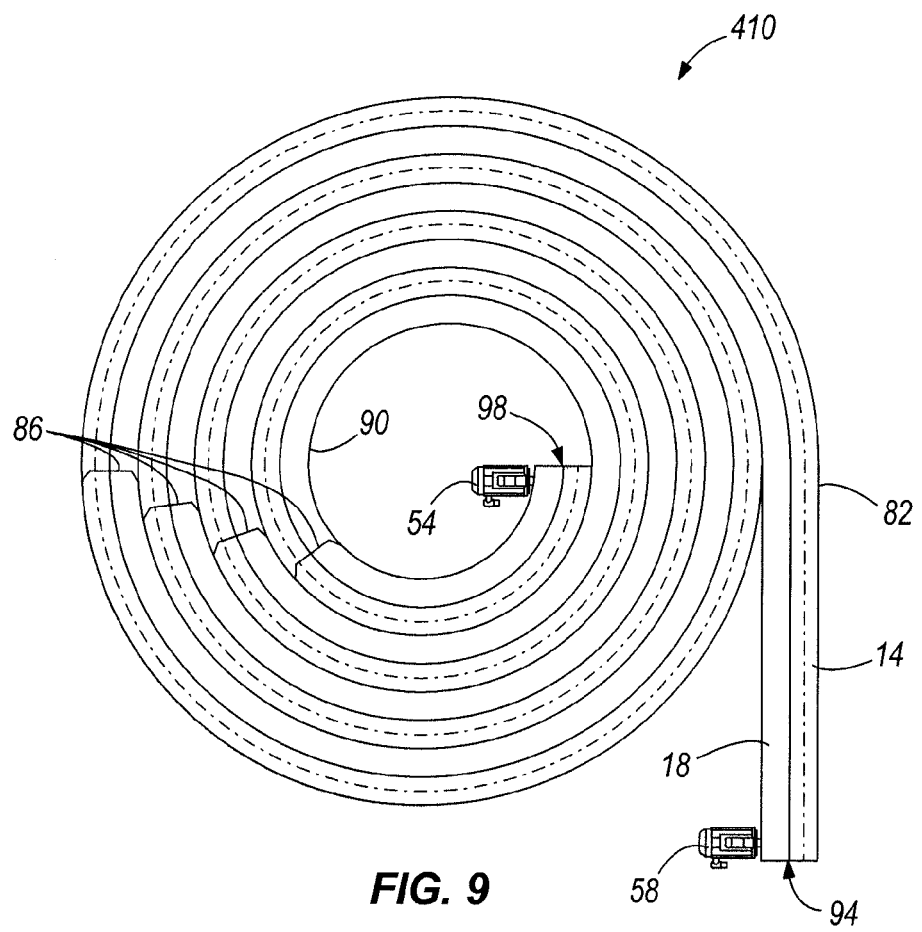
FIG. 9 is a top view of a dynamic conveyance device according to another embodiment of the invention, the conveyance device having a circular configuration.

FIG. 9 illustrates a dynamic conveyance device 410 according to another embodiment of the invention. The conveyance device 410 is similar to the conveyance device 10 shown in FIGS. 1-3, and like features will be identified by the same reference numerals. In the illustrated embodiment, the conveyance device 410 has a generally circular configuration and includes four conveyor sections 86 between the outermost edge 82 and the innermost edge 90.

Figure 10:
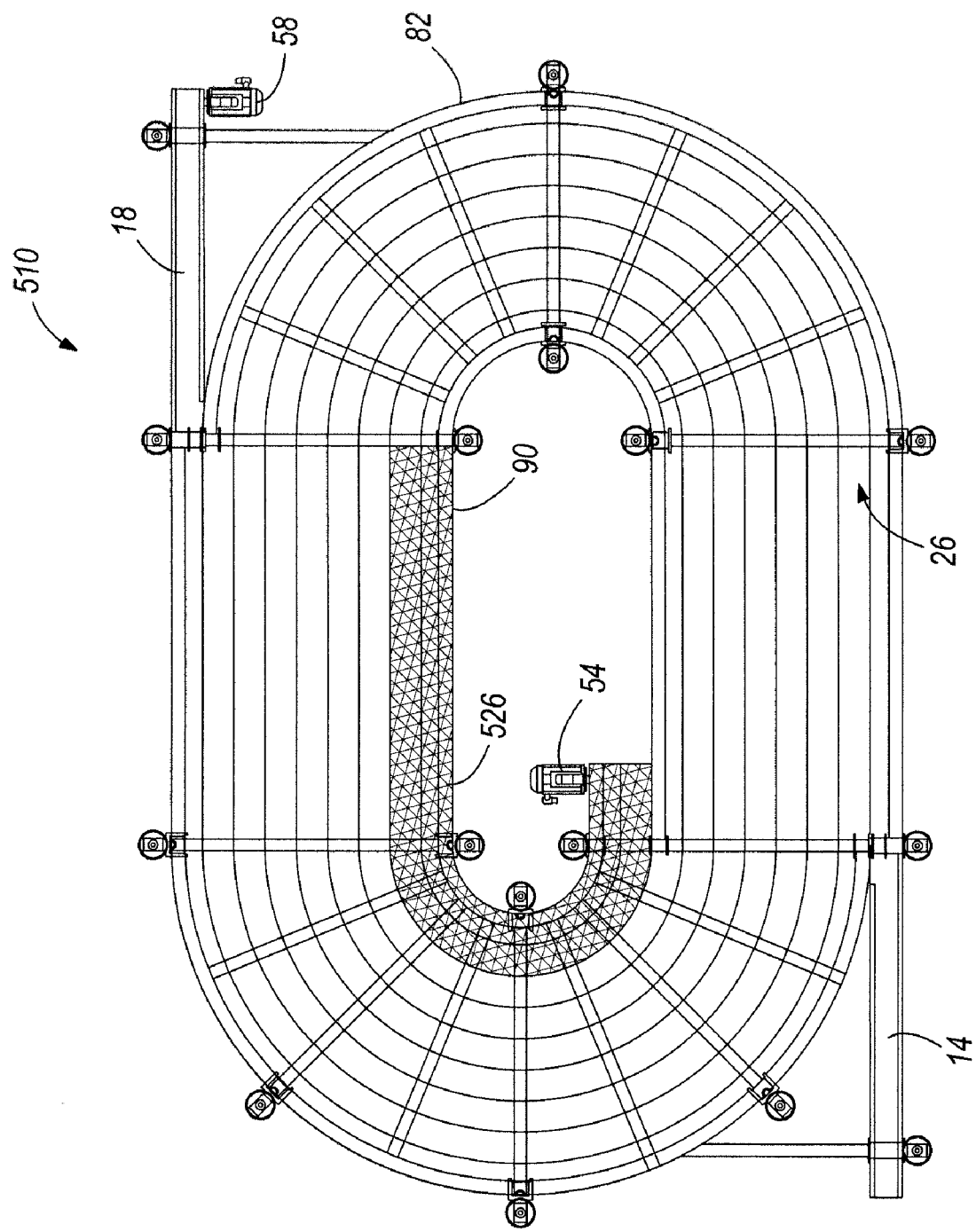
FIG. 10 is a top view of a dynamic conveyance device according to another embodiment of the invention, the conveyance device having an inclined section for use with a tiered conveyance system.

FIG. 10 illustrates a dynamic conveyance device 510 according to another embodiment of the invention. The conveyance device 510 is similar to the conveyance device 10 shown in FIGS. 1-3, and like features will be identified by the same reference numerals. In the illustrated embodiment, the conveyance device 510 has a generally ovular configuration and the infeed conveyor 14 enters the conveyance device 510 at one end of the device 510, while the outfeed conveyor 18 exits the device 510 at an opposite end. The conveyance device 510 includes linear and arcuate track segments to form the infeed and outfeed paths 14, 18.

In the embodiment shown in FIG. 10, the conveyance device 510 is for use in a tiered conveyance system (not shown) that includes multiple levels of conveyance devices. An innermost portion 526 of the infeed path 14 and the outfeed path 18 is inclined upwardly, as shown by the shaded portion in FIG. 10, to a second conveyance device (not shown) positioned above the first conveyance device 234. The infeed path 14 mates with an infeed path of the second conveyance device and the outfeed path 18 mates with an outfeed path of the second conveyance device. In the illustrated embodiment, the travel path or lane 26 of the first conveyance device 510 moves from the outermost portion of the device 510 to the innermost portion of the device 510, whereas a travel path or lane of the second conveyance device moves from the innermost portion to the outermost portion. As such, the tiered conveyance system may include a single transfer assembly that travels between the first and second conveyance devices.

Figure 11:
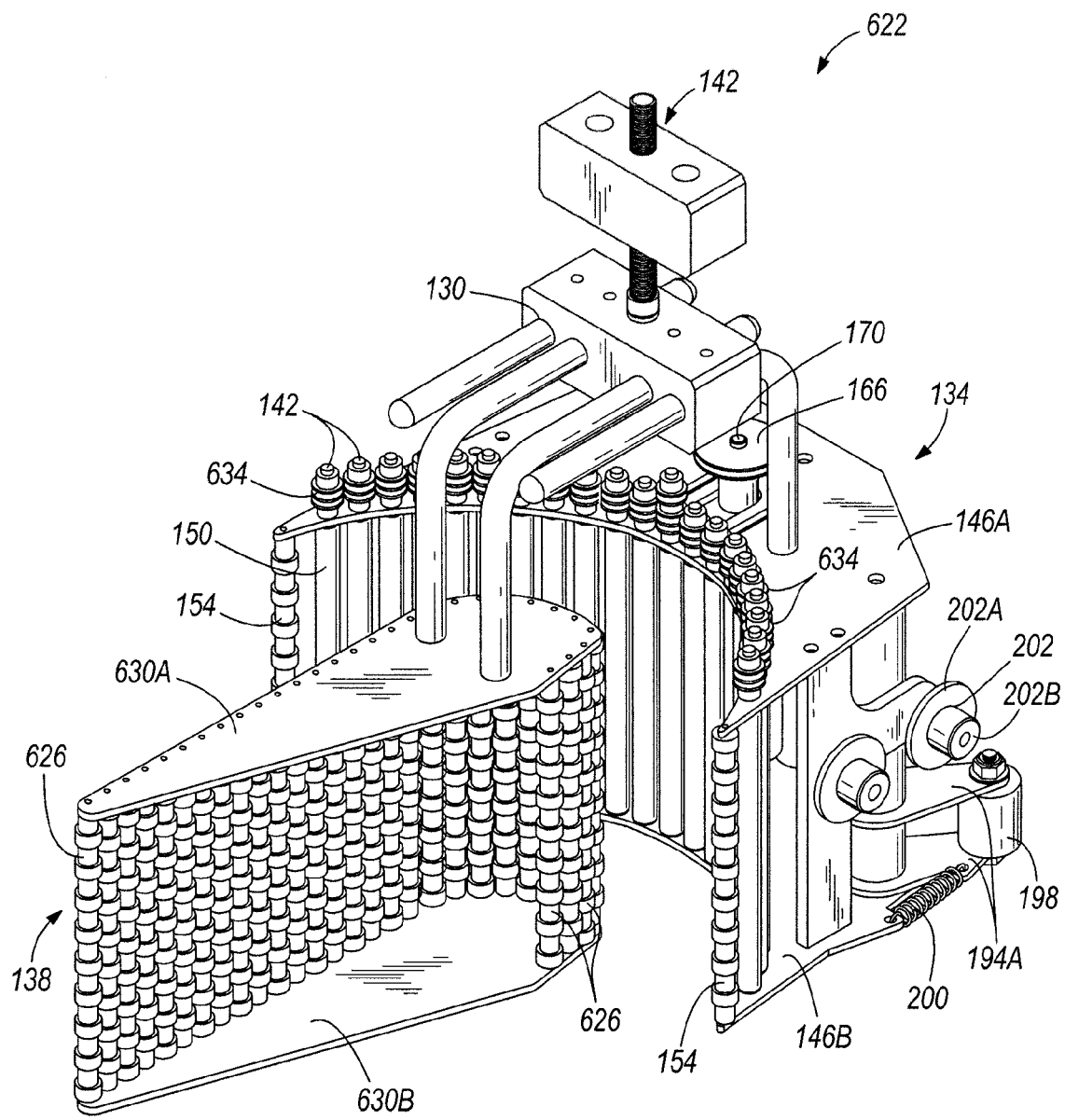
FIG. 11 is a perspective view of a transfer assembly according to another embodiment of the invention.

FIG. 11 illustrates a transfer guide assembly 622 according to another embodiment of the invention. The transfer assembly 622 is similar to the transfer assembly 22 shown in FIGS. 4A and 4B, and like structure will be identified by the same reference numerals. The transfer assembly 622 includes the frame 130, the outer guide means 134 supported by the frame 130, and the inner guide means 138 supported by the frame 138. In the illustrated embodiment, the inner guide means 138 includes a plurality of rollers 626 supported between a first plate 630A and a second plate 630B of the inner guide means 138. The rollers 626 may be idle rollers, may be driven in a manner similar to the shafts 142 of the outer guide means 134, or may be driven in a different manner. In the illustrated embodiment, the outer guide means 134 includes a pulley 634 coupled to an end of each shaft 142. Timing belts (not shown) couple each pulley 634 to the adjacent pulleys 634 such that the shafts 142 rotate together.

Figure 12:
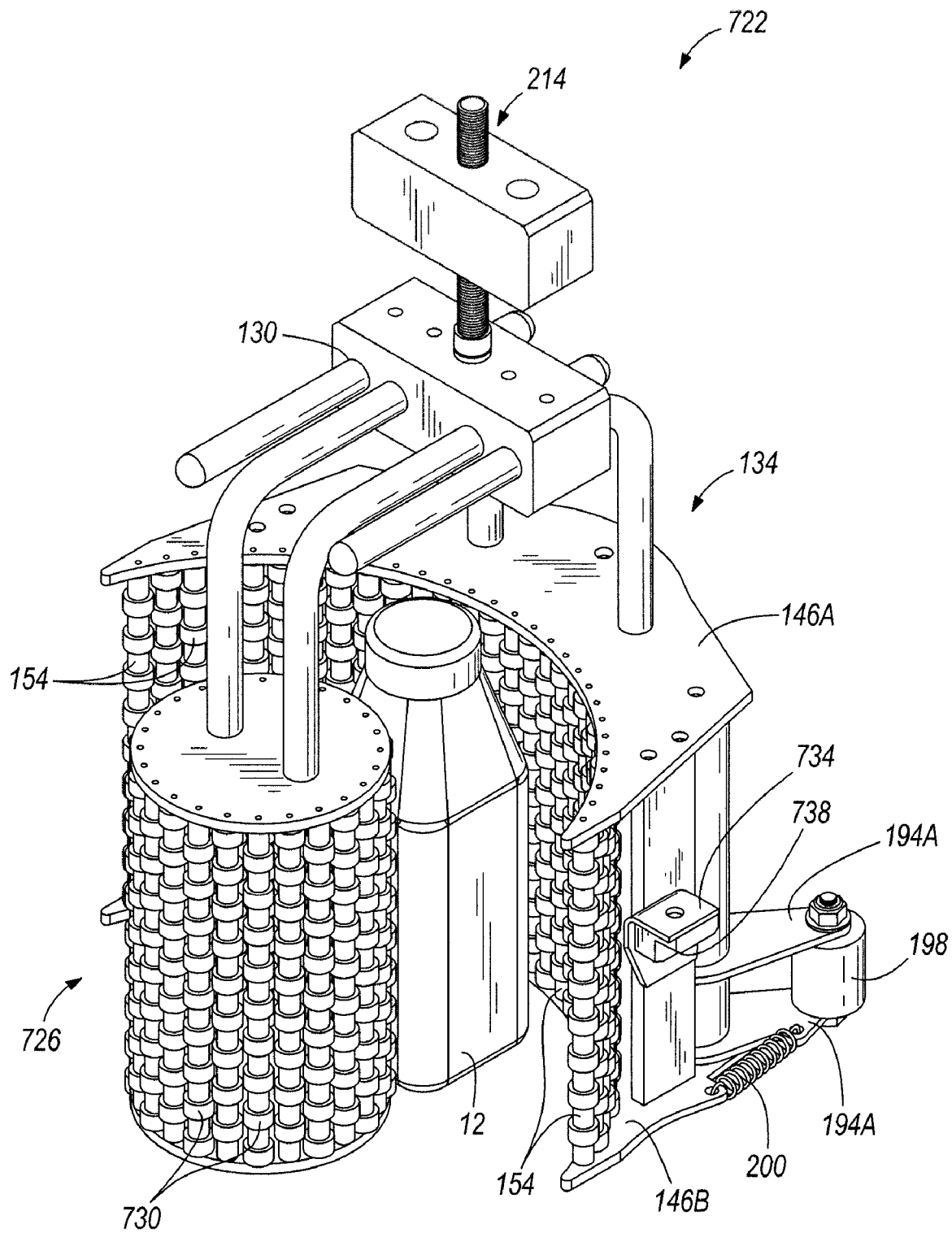
FIG. 12 is a perspective view of a transfer assembly according to yet another embodiment of the invention.

FIG. 12 illustrates a transfer guide assembly 722 according to another embodiment of the invention. The transfer assembly 722 is similar to the transfer assemblies 22, 622 shown in FIGS. 4A, 4B, and 11, and like structure will be identified by the same reference numerals. The transfer assembly 722 includes the frame 130, the outer guide means 134 having rollers 154 along an inner periphery, and a cylindrical inner guide means 726 having rollers 730 about an outer circumference. In some embodiments, the inner guide means diameter may be adjusted to accommodate different sizes of products 12. The illustrated transfer assembly 722 also includes a guide member 734 extending outwardly from the outer guide means 134 and having a notched surface 738 to ride upon the guide rails 106. In some embodiments, the guide member 734 may be a wedge member, a pair of flanged cam followers, rollers, or the like.

Figure 13:
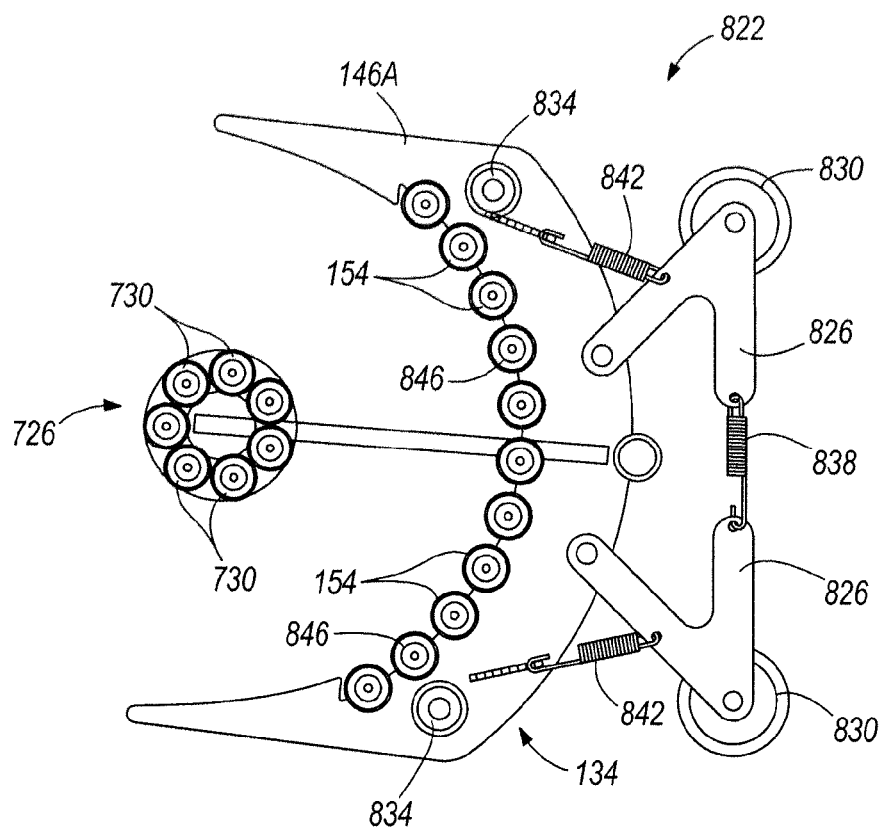
FIG. 13 is a top view of a transfer assembly according to yet another embodiment of the invention.

FIG. 13 illustrates a transfer guide assembly 822 according to another embodiment of the invention. The transfer assembly 822 is similar to the transfer assemblies 22, 622, 722 shown in FIGS. 4A, 4B, 11, and 12, and like structure will be identified by the same reference numerals. Guide frames 826 are pivotally coupled to the support plate 146A and extend from a rear edge of the transfer assembly 822. A roller 830 is supported by each guide frame 826 and extends outwardly from the respective guide frame 826 for riding along the guide rails 106 of the conveyance device 10 and providing stability to the transfer assembly 822. Rollers 834 are also supported by the frame 130 for riding along the guide rails 106 of the conveyance device 10. A spring 838 connects the guide frames 826 together, and springs 842 connect each guide frame 826 to the support plate 146A. The springs 838, 842 allow the guide frames 826 to move relative to the guide rails 106 of the conveyance device 10.

In the illustrated embodiment, the shafts 142 include internal motor power rollers 846, which are self-driven to facilitate transfer of products 12 through the transfer assembly 822 and between the infeed and outfeed paths 14, 18. In another embodiment, the outer guide means 134 and the inner guide means 138 each include at least one timing belt and a pair of sheaves to drive the shafts 142.

Figure 14:
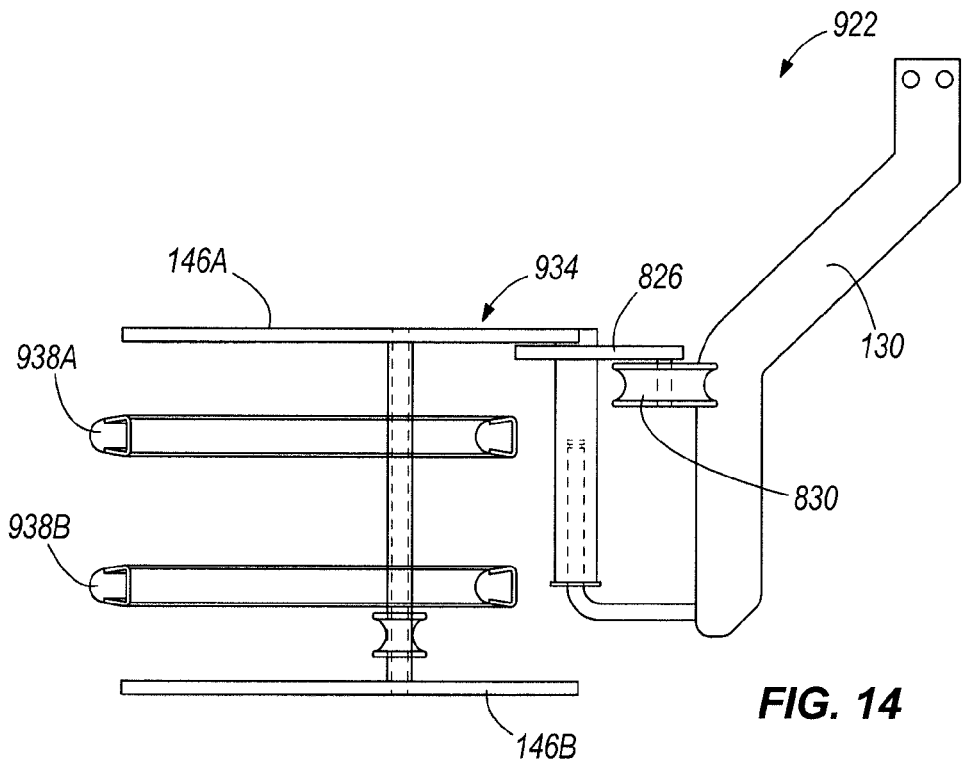
FIG. 14 is a side view of a transfer assembly according to yet another embodiment of the invention.

FIG. 14 illustrates a transfer guide assembly 922 according to another embodiment of the invention. The transfer assembly 922 is similar to the transfer assemblies 22, 622, 722, 822 shown in FIGS. 4A, 4B, and 11-13, and like structure will be identified by the same reference numerals. The transfer assembly 922 includes an outer guide means 934 having two spaced apart, horizontally aligned guide rails 938A, 938B supported by the frame 130.

Figure 15:
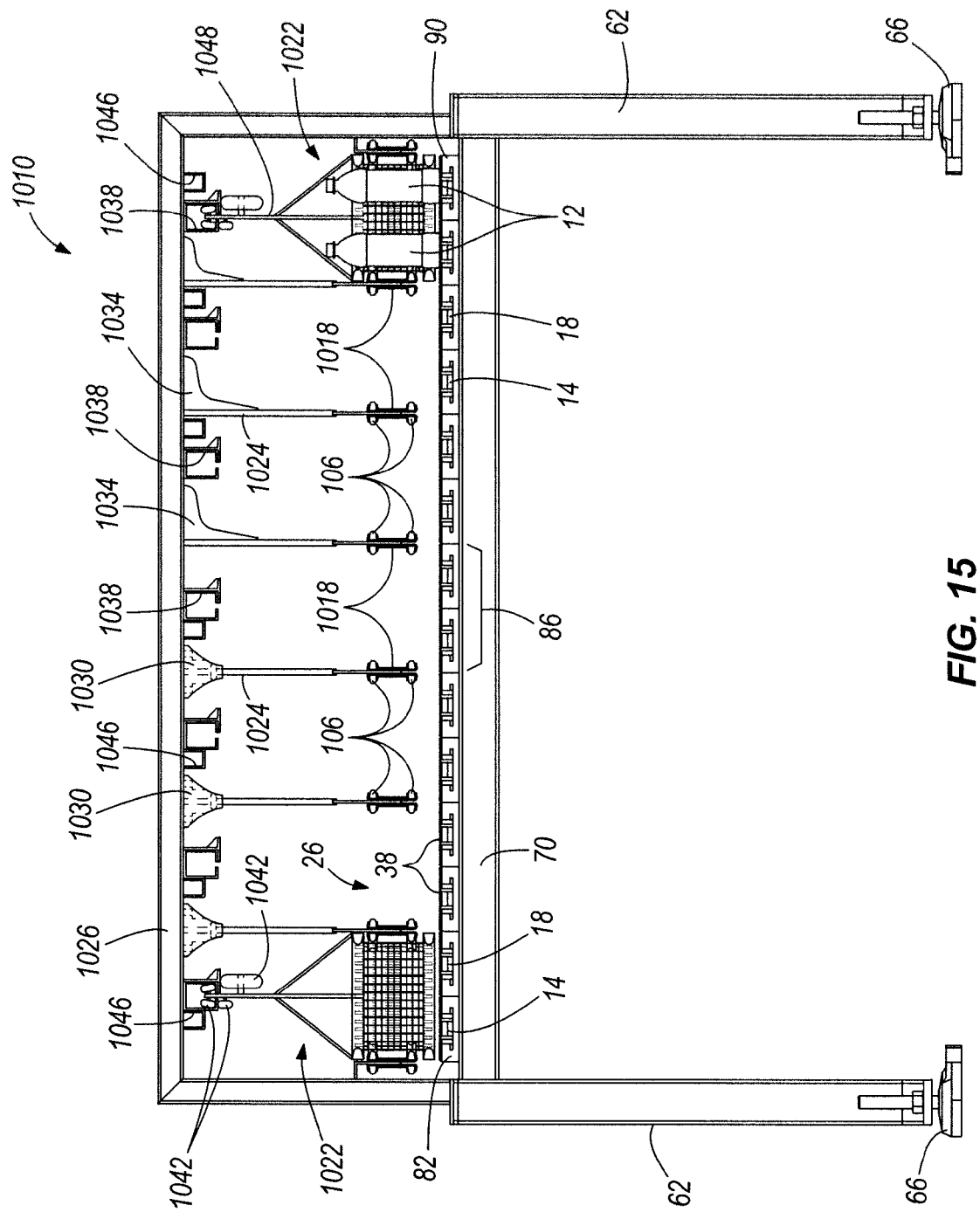
FIG. 15 is a sectional view of a dynamic conveyance device according to another embodiment of the invention, the dynamic conveyance device including a transfer assembly, an overhead support, and a trolley track.

FIG. 15 illustrates a dynamic conveyance device 1010 and an overhead mounted transfer guide assembly 1022 according to another embodiment of the invention. The conveyance device 1010 is similar to the conveyance device 10 shown in FIGS. 1-3, and like features will be identified by the same reference numerals. The guide rails 106 are positioned between each conveyor section 86 to provide guidance and stability to products 12 conveyed along the infeed path 14 and the outfeed path 18. In the illustrated embodiment, the guide rails 106 are supported by guide rail clamps 1018 that are mounted to a bracket 1024 supported by an overhead frame section 1026. Each bracket 1024 includes two guide rail clamps 1018 and each clamp 1018 supports two guide rails 106 oriented in opposite directions such that one rail 106 faces the adjacent infeed path 14 and the opposite rail 106 faces the adjacent outfeed path 18. Each bracket 1024 is coupled to the overhead frame 1026 by a triangular shaped mount 1030 or an L-shaped mount 1034, although other known mounts or hangers may be used. In the illustrated embodiment, the guide rail segments 106 form one continuous guide rail 106 about the conveyance device 1010 between the start point 94 and the termination point 98.

Positioned between adjacent mounts 1030, 1034 and coupled to the overhead frame 1026 is a trolley track 1038 for supporting the transfer guide assembly 1022. Wheels 1042 of the transfer assembly 1022 travel along the track 1038 to move the transfer assembly 1022 along the lane 26. In the illustrated embodiment, a power track 1046 is positioned adjacent the trolley track 1038 for supplying power to the transfer assembly 1022 or supporting a power source for the transfer assembly 1022. For example, the power track 1046 may be an induction rail. In a further embodiment, the power track 1046 is a side mounted induction rail mounted to the guide rail bracket 1024. For example, the power track 1046 is a curvilinear induction rail that powers the transfer assembly 1022. In another embodiment, the power source for the transfer assembly 1022 is a battery. For example, in a normal operating position, the transfer assembly 1022 is in a "docked" position on the power track 1046, which automatically charges the battery as required.

The illustrated transfer assembly 1022 includes an upper frame arm 1048 that supports the wheels 1042 for moving and guiding the transfer assembly 1022 along the trolley track 1038. At least one of the wheels 1042 is driven by a motor (not shown) to move the transfer assembly 1022. Two transfer assemblies 1022 are shown in FIG. 15, one at the outermost conveyor section 86 and one at the innermost conveyor section 86, for ease of discussion and to show different orientations for the tracks 1038; however, in the illustrated embodiment, only one transfer assembly 1022 is used for the conveyance device 1010.

Figure 16:
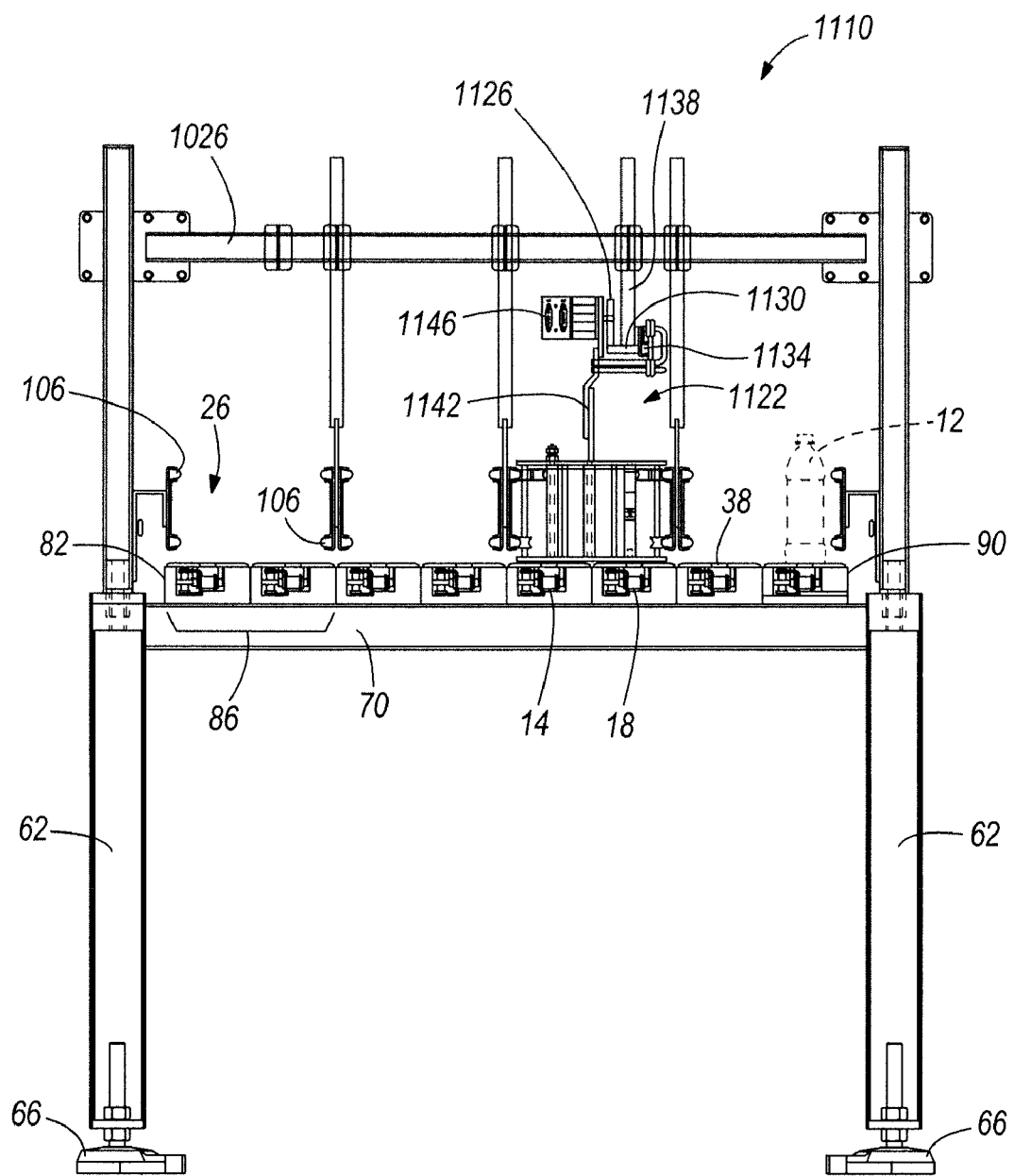
FIG. 16 is a sectional view of a dynamic conveyance device according to another embodiment of the present invention, the dynamic conveyance device including a transfer assembly, an overhead support, and a gear rack.
Figure 17:
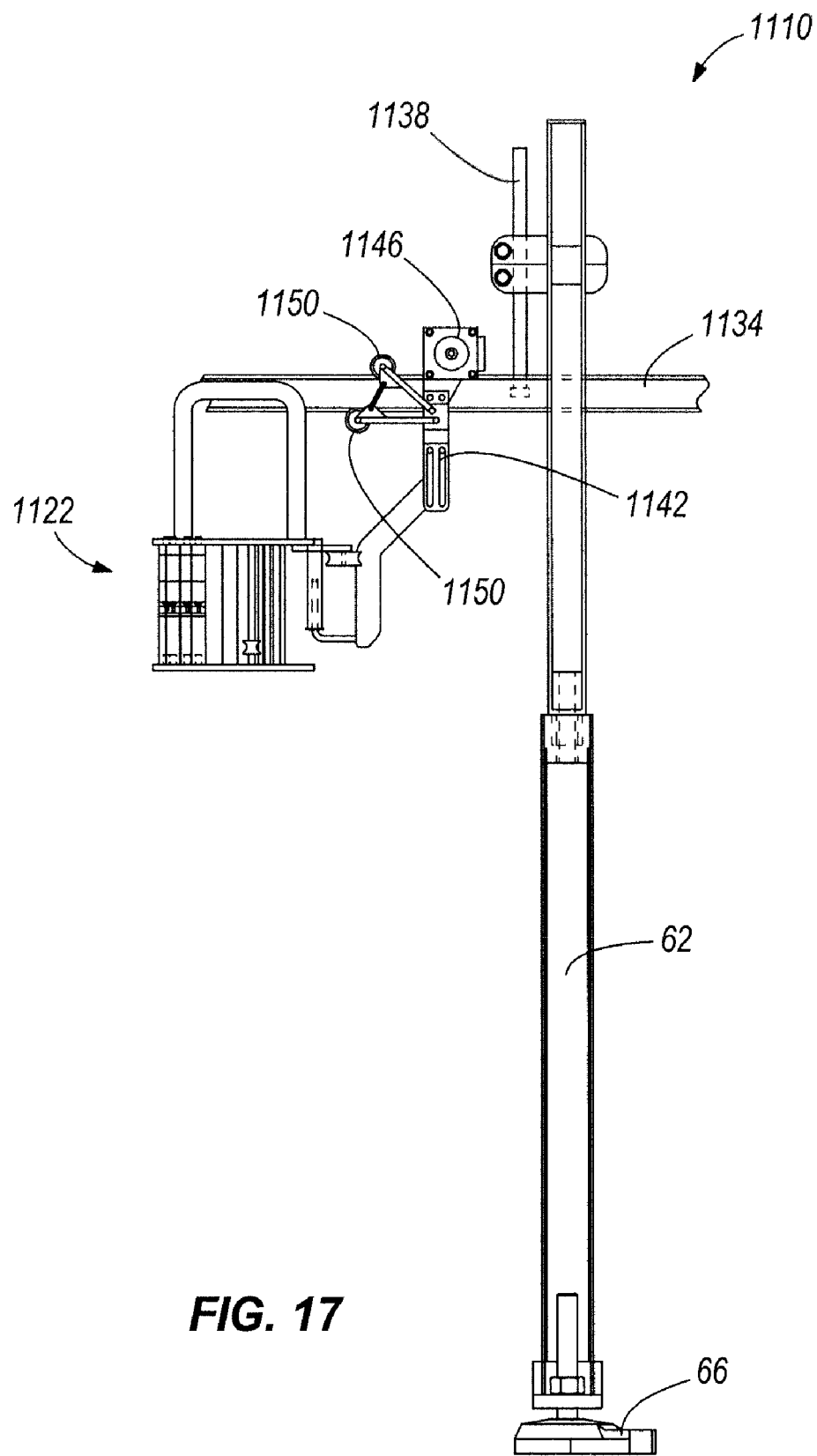
FIG. 17 is a side view of a portion of the dynamic conveyance device shown in FIG. 16.

FIGS. 16 and 17 illustrate a dynamic conveyance device 1110 and an overhead mounted transfer guide assembly 1122 according to another embodiment of the invention. The conveyance device 1110 is similar to the conveyance devices 10, 1010 shown in FIGS. 1-3 and 15, and like features will be identified by the same reference numerals. The transfer assembly 1110 includes a motor driven pinion gear 1126 and a gear rack 1130 to move the transfer assembly 1122 along a trolley track 1134. The trolley track 1134, or guide track, is supported by a track support arm 1138 and includes the gear rack 1130 that extends along a length of the track 1134. The transfer assembly 1122 includes an upper arm 1142 with a servo motor 1146 attached at a free end. The servo motor 1146 includes the rotatable pinion gear 1126 that engages with and rides on the gear rack 1130 to move the transfer assembly 1122 along the track 1134 and parallel to the conveyor sections 86. In one embodiment, such as the illustrated embodiment, the transfer assembly 1122 includes a pair of tension guide wheels 1150 to further guide the transfer assembly 1122 along the track 1134.

It should be readily apparent to those of skill in the art that the various features and elements of the dynamic conveyance devices 10, 310, 410, 510, 1010, 1110 and transfer assemblies 22, 622, 722, 822, 922, 1022, 1122 may be used as alternatives and/or in combination with each other. In addition, the various embodiments herein may be incorporated with conveyance devices having other sizes or numbers of conveyor sections. For example, the amount of accumulation area will depend upon the length and width of the conveyance device. The spiral configuration of the conveyor path provides an increased volume of accumulated product and accumulation area while the conveyance device utilizes the least amount of floor space. For example, in one embodiment, the conveyance device occupies an area of 324 square feet and provides an accumulation zone of 714 feet. In another embodiment, the conveyance device occupies an area of 139 square feet and provides an accumulation zone of 310 feet.

Although particular embodiments of the present invention have been shown and described, other alternative embodiments will be apparent to those skilled in the art and are within the intended scope of the present invention. The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention.

What is claimed is:

1. A conveyance device configured to carry a product, the conveyance device comprising:
    a first path configured to carry the product in a first direction, wherein the first path includes an arcuate portion;
    a second path configured to carry the product in a second direction;
    a transfer assembly positioned adjacent to a portion of the first path to facilitate transfer of the product from the first path to the second path; and
    a guide system configured to move the transfer assembly along the first path, the guide system including a base positioned proximate the first path and the second path, and an arm coupled to the base and extending across a portion of the first path and a portion of the second path, wherein the arm is coupled to the transfer assembly and is configured to move the transfer assembly along the arm and along an arcuate path with respect to the base that corresponds to the arcuate portion of the first path.

2. The conveyance device of claim 1 wherein the transfer assembly is positioned adjacent to a portion of the second path, and wherein the guide system is configured to move the transfer assembly along both the first path and the second path.

3. The conveyance device of claim 1 wherein the transfer assembly includes a slider device to facilitate slidably coupling the transfer assembly to the arm.

4. The conveyance device of claim 1 wherein the second path is positioned adjacent to and generally aligned with the first path.

5. The conveyance device of claim 4 wherein the first path and the second path have a generally spiral configuration.

6. The conveyance device of claim 5 wherein the spiral configuration of the first path and the second path defines a central area, and further wherein the base is positioned in the central area.

7. The conveyance device of claim 5 wherein the spiral configuration has a generally ovular shape.

8. The conveyance device of claim 5 wherein the spiral configuration has a generally circular shape.

9. The conveyance device of claim 4 wherein the first path and the second path define a lane configured to carry the product, and further comprising a rail positioned between adjacent portions of the lane.

10. The conveyance device of claim 9 wherein the transfer assembly engages a portion of the rail to move along the first path.

11. The conveyance device of claim 1 wherein the second direction is substantially opposite to the first direction.

12. The conveyance device of claim 1 wherein the first path and the second path define a horizontal plane, and further wherein a portion of the first path and a portion of the second path are inclined with respect to the horizontal plane.

13. The conveyance device of claim 1 wherein the guide system includes a motor configured to move the arm in a generally linear direction along the base.

14. The conveyance device of claim 1 wherein the guide system includes a motor configured to rotate the arm relative to the base.

15. The conveyance device of claim 1 wherein the transfer assembly includes a frame, an outer guide coupled to the frame and having at least one roller, and an inner guide coupled to the frame and positioned radially inwardly from the outer guide.

16. The conveyance device of claim 15 wherein the at least one roller is a driven roller.

17. The conveyance device of claim 15 wherein the inner guide includes at least one roller.

18. A conveyance device configured to carry a product, the conveyance device comprising:
   a first path configured to carry the product in a first direction;
   a second path configured to carry the product in a second direction;
   a transfer assembly positioned adjacent to a portion of the first path to facilitate transfer of the product from the first path to the second path; and
   a guide system configured to move the transfer assembly along the first path, the guide system including a base positioned proximate the first path and the second path, and an arm coupled to the base and extending across a portion of the first path and a portion of the second path, the arm configured to move in a first manner and a second manner relative to the base, wherein the transfer assembly is movably coupled to the arm, and wherein the transfer assembly includes a slider device to facilitate slidably coupling the transfer assembly to the arm.

19. A conveyance device configured to carry a product, the conveyance device comprising:
   a lane having a plurality of arcuate portions which at least in part define a generally spiral configuration such that portions of the lane are positioned adjacent to each other, the lane including a first end positioned generally outwardly of the spiral configuration, a second end positioned generally inwardly of the spiral configuration, a first path configured to carry the product towards the second end, and a second path adjacent to and generally aligned with the first path, the second path configured to carry the product towards the first end;
   a transfer assembly positioned adjacent to at least a portion of the lane to facilitate transfer of the product from the first path to the second path; and
   a guide system configured to move the transfer assembly along the lane, the guide system including a base positioned proximate the lane, and an arm coupled to the base and extending across a portion of the lane, wherein the transfer assembly is coupled to the arm and is movable along the arm and along an arcuate path with respect to the base so as to enable movement of the transfer assembly along the arcuate portions of the lane.

20. The conveyance device of claim 19 wherein the transfer assembly includes a slider device to facilitate slidably coupling the transfer assembly to the arm.

21. The conveyance device of claim 19 wherein the system includes a first motor configured to move the transfer assembly along the arm and a second motor configured to move the transfer assembly along the arcuate path.

22. The conveyance device of claim 19 wherein the spiral configuration has a generally circular shape.

23. The conveyance device of claim 19 wherein the spiral configuration has a generally ovular shape.

24. A conveyance device configured to carry a product, the conveyance device comprising:
   a first path configured to carry the product in a first direction;
   a second path positioned adjacent to and generally aligned with the first path to define a lane, the second path configured to carry the product in a second direction that is substantially opposite the first direction, the first path and the second path having a generally spiral configuration such that portions of the lane are adjacent to each other;
   a transfer assembly positioned adjacent to a portion of the lane to facilitate transfer of the product from the first path to the second path, the transfer assembly including a frame, an outer guide coupled to the frame and having at least one roller, an inner guide coupled to the frame and positioned radially inwardly from the outer guide, and a slider device coupled to the frame; and
   a guide system configured to move the transfer assembly along the first path and the second path, the guide system including a base positioned proximate the first path and the second path, an arm rotatably and slidably coupled to the base, the arm extending above a portion of the lane, wherein the transfer assembly is slidably coupled to the arm by the slider device to facilitate movement of the transfer assembly relative to the arm, a first motor configured to move the arm in a generally linear direction along the base, and a second motor configured to rotate the arm relative to the base.

* * * * *